United States Patent
Greif et al.

[11] Patent Number: 6,158,471
[45] Date of Patent: Dec. 12, 2000

[54] MIXING DEVICE FOR CHANGING A FLUID INTO ANOTHER FLOWING FLUID

[75] Inventors: Volker Greif, Sindelfingen; Stefan Kochert, Weinstadt; Klaus Moessinger, Obersulm; Bernd Spaeth, Ulm, all of Germany

[73] Assignee: Filterwerk Mann & Hummel GmbH, Ludwigsburg, Germany

[21] Appl. No.: 09/346,585

[22] Filed: Jul. 2, 1999

[30] Foreign Application Priority Data

Jul. 3, 1998 [DE] Germany ............... 198 29 769

[51] Int. Cl.[7] ............... G05D 11/03
[52] U.S. Cl. ............... 137/895; 137/599.12
[58] Field of Search ............... 137/599.12, 895, 137/599.03, 601.2, 896

[56] References Cited

U.S. PATENT DOCUMENTS 2,842,159  7/1958  Sprague .
2,873,758  2/1959  Nielsen ............... 137/599.12
2,976,882  3/1961  Cowan .
5,490,576  2/1996  Huang ............... 137/892

*Primary Examiner*—Stephen Hepperle
*Attorney, Agent, or Firm*—Evenson, McKeown, Edwards & Lenahan, P.L.L.C.

[57] ABSTRACT

A mixing device is suggested for introducing a fluid into another flowing liquid, especially for use as an oil lubricator. This lubricator consists of an exterior venturi pipe 18 and an interior venturi pipe 16, whereby a feed line 13 ensures the supply of the oil to be mixed into the interior venturi pipe 16. The feed line 13 is connected to the storage tank 28 of the lubricator by means of a butterfly valve 30 and a uptake 29. A control insert 20 is mounted in the ring-shaped cross-section between the interior pipe 16 and the flow channel 18. This has elastic blades in particular, which largely close the circular ring section at lower amounts of throughput of the air, such that even in this operational state, consistently good mixing results of the oil with the air can be guaranteed in interior pipe 16.

9 Claims, 2 Drawing Sheets

MIXING DEVICE FOR CHANGING A FLUID INTO ANOTHER FLOWING FLUID

STATE OF THE ART

The invention relates to a mixing device for introducing a fluid into another flowing fluid according to the type in patent claim 1. In addition, the invention relates to a method for manufacturing the above-mentioned mixing device.

Mixing devices of this type are known from patent document U.S. Pat. No. 5,490,576. A device is described which has a flow channel for conducting gases. An interior pipe which the gas also flows through is arranged in the flow channel. This interior pipe has a supply line, through which a fluid can be introduced into the interior pipe. The fluid introduced is entrained by the flowing gas. A partial vacuum has to be produced to this end in the interior pipe for the supply. This effect generally arises in the interior pipe/feed line arrangement, but can be reinforced by an interior contour in the pipe fashioned like a venturi tube.

Devices of this type are supposed to operate reliably at different gas flow rates. In order to attain a sufficient flow speed for distributing the fluid even at lower levels of output, a butterfly valve can be arranged in the flow channel. This narrows the cross-section of the flow channel at lower levels of output, thus effecting an increase in the rate of flow. The disadvantage in the above-noted butterfly valve, however, is that it has a negative influence upon the homogeneity of the flow. In this manner, the distribution of the fluid in the flowing gas also deteriorates. Moreover, the effect sought after by using the butterfly valve is limited because the fluid behind the butterfly valve once again becomes distributed over the entire cross-section of the flow channel; thus the flow rate of the gas decreases towards the original value.

The task of the invention consists of creating a mixing device which facilitates an ideal distribution of the fluid to be introduced, independent of the amount of output. This task is solved by the characteristics in patent claim 1.

ADVANTAGES OF THE INVENTION

The inventive mixing device has a flow channel in which an interior pipe is provided with a supply line for the fluid to be introduced. In addition, blades have been provided, which extend into the cross-section of the flow channel and which can lengthen said channel at lower levels of output of the flowing fluid. The advantage of the invention lies in the parallel arrangement of interior pipe and swinging blades. The blades thus only have an effect upon the cross-section around the interior pipe. The flow channel cross-section around the interior pipe is gradually closed more and more so that the throughput of the fluid becomes increasingly concentrated on the interior pipe. An ideal distribution of the fluid to be introduced is thus attained, even with the lowest levels of output of the flowing liquid.

Another advantage of this arrangement is that the flowing liquid always flows directly against the interior pipe. The flow into the interior pipe is therefore very homogenous, which improves the distribution of the fluid to be introduced. The blades hinder the flow of the flowing liquid in an area which is of little significance to the distribution of the fluid to be introduced. This effect still can be improved in accordance with a further embodiment of the invention if the blades and the interior pipe are arranged symmetrically around the center of the flow cross-section of the flow channel. An ideal result can be attained with a round cross-sectional form of the flow cross-section.

In accordance with a particular form of the embodiment of the invention, the interior pipe is embodied as a venturi pipe. By this means, an increase in the flow rate can be obtained in the interior pipe. The pressure difference at the feed line opening in the interior pipe thus increases and larger amounts of the fluid to be introduced can be distributed better. Furthermore, it is advantageous that the loss in pressure of the fluid flowing through only becomes insignificantly larger in this process.

Embodying the flow channel as a venturi pipe is also advantageous. The flow against the blades can be improved by this means. In addition, the flow rate of the flowing liquid becomes increased overall. This also has an indirect effect upon the rate of flow in the interior pipe. Moreover, the use of venturi pipes also has the advantage that the distribution of the fluid to be introduced is significantly improved in its diffuser areas.

Another version condenses the blades into a single component. This so-called control insertion can be used easily in the flow channel. Making the control insert out of synthetic material is advantageous. This then can be cast as a single piece, in which the blades have elastic zones which ensure their adjustability on the one hand and their restoring effect at lower levels of output of the flowing liquid on the other. Of course, such a one-piece embodiment can also be made of metallic materials. The costs of manufacturing the control insert can be reduced considerably with the single-piece construction.

In accordance with another embodiment of the invention, the mixing device can be connected to the intake channel of an internal combustion engine. The supply line serves to load the crankcase gases into the intake air in this version. The advantages of the homogenous intermixture of crankcase gases and intake air have a positive effect upon the combustion process in the cylinders of the internal combustion engine in this connection.

Another effective embodiment of the invention provides the connection of the supply channel to a store tank. This contains the fluid to be introduced and is fitted with a pressure compensation bore hole immediately adjacent to the flow channel. It is advantageous to connect the storage tank to the mixing device with a synthetic ring which has been mounting-injected.

These and other characteristics of preferred embodiments of the invention proceed from the description and the drawings as well as from the claims, whereby the individual characteristics can be realized individually or in combination with one another in the form of sub-combinations of the form of the embodiment of the invention and in other contexts and can represent advantageous embodiments that are protectable in and of themselves, for which protection is claimed here:

DRAWING

Further details of the invention are described in the drawings using schematic exemplary embodiments. Shown are:

FIG. 1 a mixing device in longitudinal section used in the intake channel of an internal combustion engine;

FIG. 2 a control insert in longitudinal section as it is used in the mixing device in accordance with device 1;

FIG. 3 view of the control insert in accordance with FIG. 2 in flow direction;

FIG. 4 a mixing device used as a high-pressure oil lubricator in conjunction with a store tank, in which the mixing device is depicted in longitudinal section; and FIG. 5 detail X of the lubricator in accordance with FIG. 4 in cross-section, in which mixing device and storage tank are connected by a mounting-injected ring.

DESCRIPTION OF THE EXEMPLARY EMBODIMENTS

Figure 1:
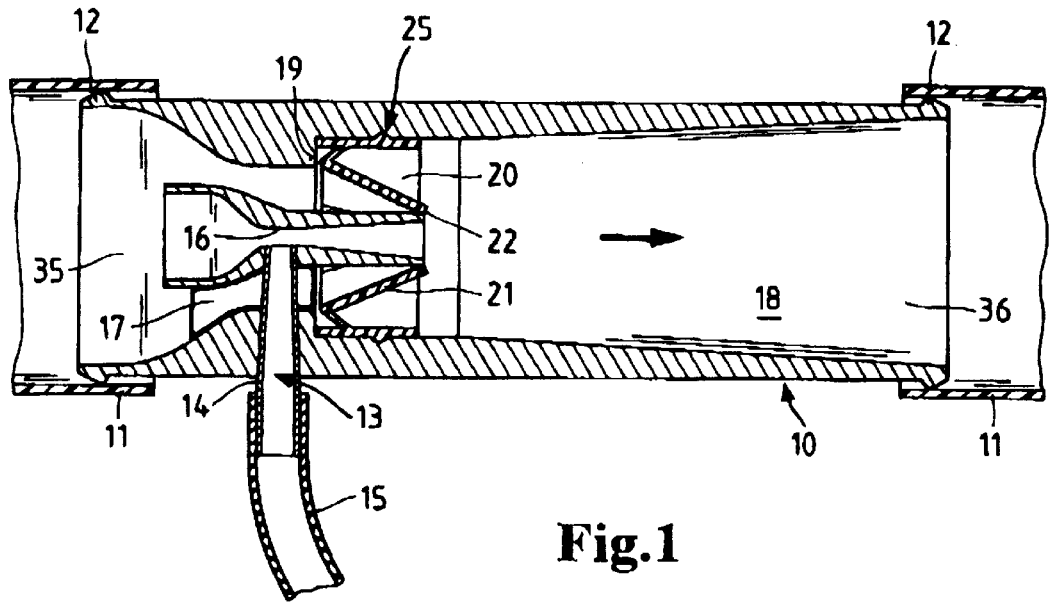

A mixing device 10 is depicted in FIG. 1 as it can for example be used in the intake tract of an internal combustion engine. The intake channel is formed by two flexible pipes 11 which are slid onto a sealing bead 12 on the mixing device. A feed line 13 has a tube connection piece 14 on its exterior. A tube 15 ensures the conduction of the crankcase gases of an internal combustion engine not depicted here.

The feed line 13 opens onto the narrowest cross-section of an interior pipe 16 fashioned like a venturi pipe. The interior pipe 16 is held by a rib 17 in a flow channel 18. The interior pipe and flow channel have a circular section and are arranged coaxially to one another.

The flow channel 18 is also embodied as a Venturi pipe. This, however, has an shoulder 19 in the vicinity of the interior pipe 16 into which a control insert 20 can be pushed. The control insert has blades 21 which perform their function inside the circular section which is fixed by the interior pipe 16 and the flow channel 18. The blades are designed to be elastic and open this circular ring section in relation to the amount of output of the flowing liquid. With very small amounts of output, the blades lean against the interior pipe by means of blade tips 22. The circular ring section is thus closed up to the fissure in the control insert and the intake air essentially flows through the interior pipe with a flow rate that is unchanged in comparison to the high amounts of output. The flow through of the mixing device is indicated by an arrow.

Figure 2:
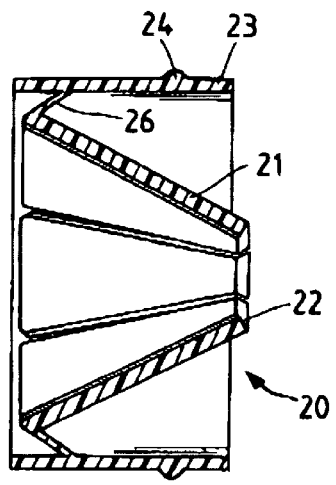

The control insert 20 used in FIG. 1 is depicted individually in detail in FIG. 2. This consists of an outer ring 23 with a mounting bead 24. If the control insert is inserted into the flow channel 18, it lies closely against the shoulder 19, in which process the mounting bead 24 fixes the control insert in the flow channel 18 in conjunct ion with a snap ring groove 25 (see FIG. 1).

The control insert is cast as a single piece. Elastic zones 26 which change into much stiffer blades 21 have been cast in one piece with the interior walls of the outer ring 23. The elastic zones ensure that the blades lie against the outer ring 23 at high levels of flowing liquid throughput and to swing back at lower levels of output in the flow cross-section.

Figure 3:
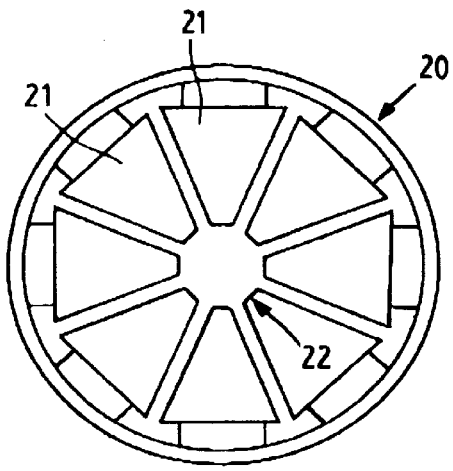

The control insert 20 is depicted in FIG. 3 in the projection of the cross-section surface of the flow channel 18. The blades (21) are constructed in the form of a trapezoid and together form an essentially conical barrier in the flow cross-section. Even with the smallest amounts of output, the blade tips 22 can open a circular section which essentially corresponds to the cross-section of the interior pipe. Said cross-section is thus never closed at any operating state of the mixing device.

Figure 4:
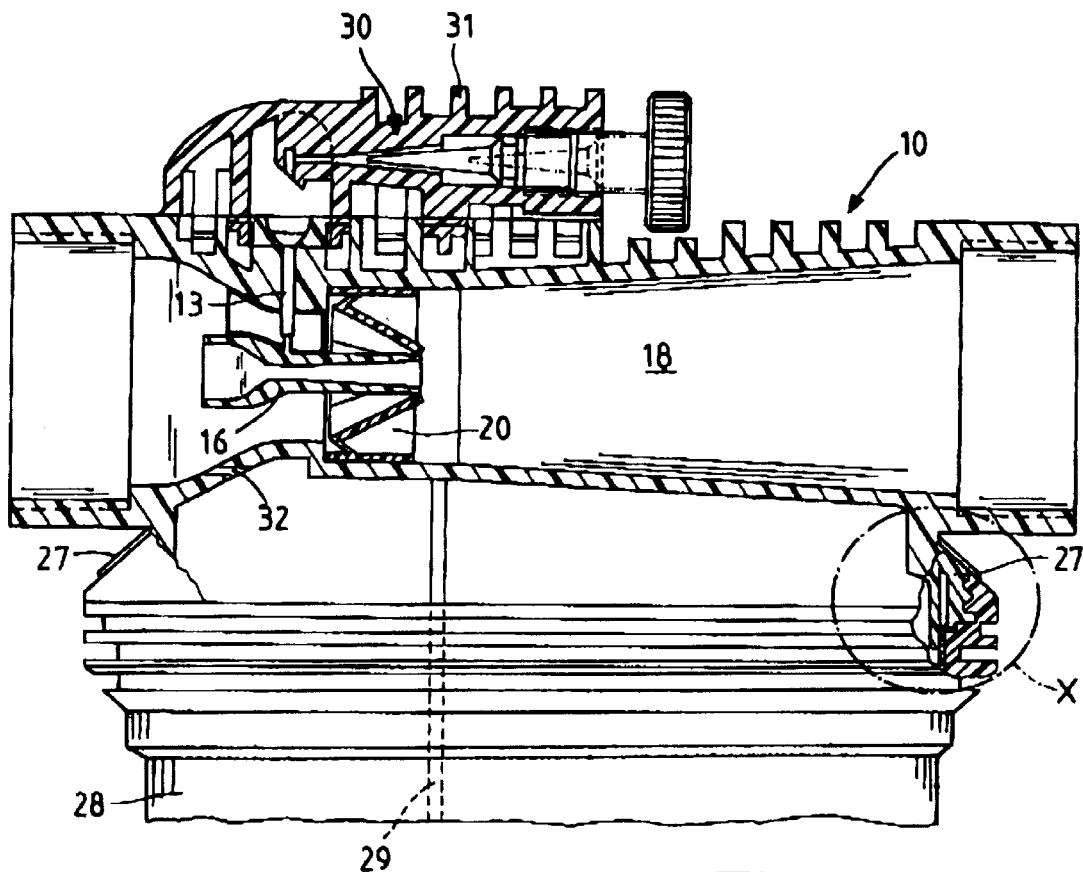

FIG. 4 shows an embodiment of the mixing device as an oil injector. Flow channel 18, interior pipe 16, and feed line 13 function in the same manner as in the embodiment described in FIG. 1. The intake channel is preferably made of synthetic material. A rounded shoulder 27 is sprayed on the underside of the mixing device for accommodating the storage tank 28.

The supply of the oil ensues via an uptake 29 which is connected by means of a butterfly valve 30 to the feed line 13. The butterfly valve can be placed in a synthetic material housing 31 which is clipped onto the mixing device in a sealing manner. The amount of oil supplied can be regulated by the butterfly valve. In order to keep the pressure difference in the oil feed line constant, a pressure compensation bore hole 32 is provided between intake channel 18 and storage tank 28.

Figure 5:
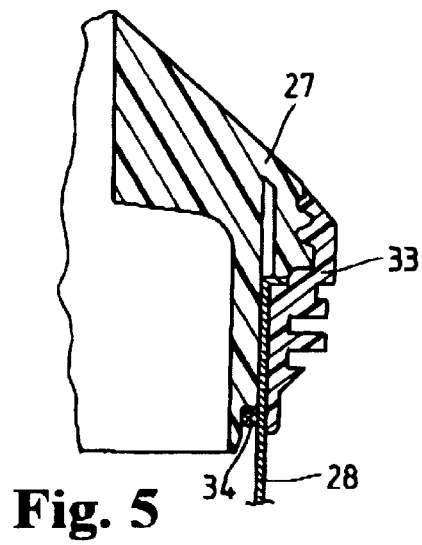

FIG. 5 shows detail X from FIG. 4. This detail shows an example of a mounting for the storage tank 28 on the shoulder 27 of the mixing device. These components are held together by a mounting-injected synthetic material ring 33. A gasket 34 can also be provided between storage tank 28 and shoulder 27.

What is claimed is:

1. A mixing device for introducing a second fluid into a flowing first fluid, said device comprising:

a flow channel having a cross section through which said first fluid flows from an inlet to an outlet;

an interior tube disposed within the cross section of the flow channel and aligned with the direction of flow of said first fluid, so that said interior tube is surrounded by a cross-sectional area of the flow channel;

a feed line for said second fluid which extends through a wall of the flow channel and opens onto the interior tube, and a plurality of vanes which extend into the cross-sectional area of the flow channel surrounding said interior tube to substantially close off the cross-sectional area of the flow channel surrounding the interior tube without closing off said interior tube;

wherein said vanes are pivotable in response to an increase in pressure of said first fluid to open the area of the flow channel surrounding the interior tube and permit increased fluid flow through said flow channel.

2. A mixing device according to claim 1, wherein the flow channel, the interior tube and the vanes are arranged substantially symmetrically around a central axis.

3. A mixing device according to claim 2, wherein the flow channel is a venturi tube.

4. A mixing device according to claim 3, wherein the interior tube is a venturi tube.

5. A mixing device according to claim 4, wherein said vanes are components of a control insert.

6. A mixing device according to claim 5, wherein said control insert is a one piece synthetic resin member in which the vanes are supported by resilient segments.

7. A mixing device according to claim 6, wherein said flow channel is segment of an air intake duct of an internal combustion engine, and said feed line is a recirculation line for crankcase gases.

8. A mixing device according to claim 7, wherein said mixing device is connected to a storage tank, said feed line being connected to a supply line extending into the storage tank, and said flow channel having a pressure compensating aperture in fluid communication with the interior of said storage tank.

9. A mixing device according to claim 8, wherein said mixing device is connected to said storage tank by an assembly injection molded synthetic resin ring.

* * * * *